United States Patent
Matsumoto et al.

(10) Patent No.: US 8,943,438 B2
(45) Date of Patent: Jan. 27, 2015

(54) VEHICLE-MOUNTED DEVICE HAVING PORTABLE-DEVICE DETECTION CAPABILITY

(75) Inventors: Nobuo Matsumoto, Iwaki (JP); Masahito Kazuno, Iwaki (JP)

(73) Assignee: Alpine Electronics, Inc., Tokyo (JP)

(*) Notice: Subject to any disclaimer, the term of this patent is extended or adjusted under 35 U.S.C. 154(b) by 298 days.

(21) Appl. No.: 13/177,273

(22) Filed: Jul. 6, 2011

(65) Prior Publication Data

US 2012/0096404 A1    Apr. 19, 2012

(30) Foreign Application Priority Data

Oct. 13, 2010 (JP) ................................. 2010-230339

(51) Int. Cl.
G06F 3/048 (2013.01)
G06F 9/44 (2006.01)

(52) U.S. Cl.
CPC ..................................... *G06F 9/4443* (2013.01)
USPC ........................................................ 715/822

(58) Field of Classification Search
CPC  G06F 3/0488; G06F 3/0362; G06F 17/30241
USPC ........................................................ 715/822
See application file for complete search history.

(56) References Cited

U.S. PATENT DOCUMENTS

| | | | |
|---|---|---|---|
| 7,606,660 B2 * | 10/2009 | Diaz et al. ...................... | 701/431 |
| 2004/0061662 A1 * | 4/2004 | Yoshihara et al. .............. | 345/1.1 |
| 2004/0204822 A1 * | 10/2004 | Kohno et al. .................. | 701/200 |
| 2005/0076308 A1 * | 4/2005 | Mansell et al. ............... | 715/811 |
| 2005/0183037 A1 * | 8/2005 | Kuenzner ....................... | 715/825 |
| 2006/0095864 A1 * | 5/2006 | Mock et al. .................... | 715/810 |
| 2006/0271618 A1 | 11/2006 | Kokubo et al. | |

(Continued)

FOREIGN PATENT DOCUMENTS

| | | |
|---|---|---|
| JP | 2006-313486 | 11/2006 |
| JP | 2007-066297 A | 3/2007 |

(Continued)

OTHER PUBLICATIONS

Alt et al., "Enabling Micro-Entertainment in Vehicles Based on Context Information", Proc. of 2nd Int'l Conf. on Automotive User Interfaces and Interactive Vehicular Applications (AutomotiveUI 2010), Nov. 2010.*

(Continued)

*Primary Examiner* — Jennifer To
*Assistant Examiner* — Joseph R Burwell
(74) *Attorney, Agent, or Firm* — Brinks Gilson & Lione

(57) ABSTRACT

For each smartphone application included in a smartphone, an identifier, such as a name of the smartphone application, and information on whether the smartphone application operates in cooperation with a vehicle-mounted device, are registered in a smartphone application management table. From the smartphone applications included in the connected smartphone, higher priority is given to the smartphone applications that are registered in the smartphone application management table as applications that operate in cooperation with the vehicle-mounted device. A lower priority is given to other smartphone applications. Icons of the high priority smartphone applications are arranged on a first page of a smartphone application menu, whereas icons of the low priority smartphone applications are sequentially arranged on second and following pages.

19 Claims, 7 Drawing Sheets

(56) References Cited

U.S. PATENT DOCUMENTS

| | | | |
|---|---|---|---|
| 2007/0018955 A1 | 1/2007 | Blersch | |
| 2007/0050128 A1* | 3/2007 | Lee et al. | 701/200 |
| 2007/0123191 A1* | 5/2007 | Simpson | 455/345 |
| 2007/0287439 A1 | 12/2007 | Weyl et al. | |
| 2007/0291664 A1 | 12/2007 | Weyl et al. | |
| 2008/0147321 A1* | 6/2008 | Howard et al. | 701/211 |
| 2009/0172599 A1* | 7/2009 | Nezu | 715/841 |
| 2010/0138149 A1 | 6/2010 | Ohta et al. | |
| 2010/0250110 A1 | 9/2010 | Kaji et al. | |
| 2011/0004822 A1* | 1/2011 | Nezu et al. | 715/702 |

FOREIGN PATENT DOCUMENTS

| | | | |
|---|---|---|---|
| JP | 2008-078696 A | 4/2008 | |
| JP | 2008-523745 | 7/2008 | |
| JP | 2009-58612 A | 3/2009 | |
| JP | 2010-102465 A | 5/2010 | |
| JP | 2010-130669 A | 6/2010 | |
| WO | WO 2009/047842 A1 | 4/2009 | |

OTHER PUBLICATIONS

Brunett, "Google's Car Home app updated, now with customization!", http://www.androidcentral.com/googles-car-home-updated-can-now-be-found-market, Oct. 1, 2010.*

Schmidt et al., "Automotive User Interfaces", Thilo Paul-Stueve (Hrsg.), Mensch & Computer 2007 Workshopband. Weimar: Verlag der Bauhaus-Universität Weimar. S. 21-23. 2007.*

Horwitz, "ALK Technologies CoPilot Live 8 North America", http://www.ilounge.com/index.php/reviews/entry/alk-technologies-copilot-live-8-north-america, Aug. 2009.*

Jung et al., "Methodology for context-sensitive system design by mapping internal contexts into visualization mechanisms", Design Studies, v. 31, n. 1, pp. 26-45, Jan. 2010.*

Kern et al., "Design Space for Driver-based Automotive User Interfaces", Proc. of 1st Int'l Conf. on Automotive User Interfaces and Interactive Vehicular Applications (AutomotiveUI 2009), pp. 3-10, Sep. 2009.*

Kern et al., "Status- und Kontextinformationen für die Telekommunikation im Auto", Gross, T. (Hrsg.), Mensch und Computer 2007: Interaktion im Plural. pp. 119-128, 2007. (Original German article along with English translation).*

Kranz et al., "Open Vehicular Data Interfaces for In-Car Context Inference", Proc. of 1st Int'l Conf. on Automotive User Interfaces and Interactive Vehicular Applications (AutomotiveUI 2009), pp. 57-62, Sep. 2009.*

Lowensohn, "Android's car home gets its own Market app", http://news.cnet.com/8301-27076_3-20018230-248.html, Sep. 30, 2010.*

Muhlbauer, "Car Home for Android Gets Personal", http://googlemobile.blogspot.com/2010/10/car-home-for-android-gets-personal.html, Oct. 1, 2010.*

PR Newswire, "ALK Technologies Announces CoPilot Live 9 Mobile Navigation Platform", Feb. 14, 2011.*

Schmidt et al., Proc. of CHI '10: Extended Abstracts on Human Factors in Computing Systems, pp. 3177-3180, Apr. 2010.*

Schmidt et al., "Driving Automotive User Interface Research", Pervasive Computing, v. 9, n. 1, pp. 85-88, Jan. 2010.*

Office Action for corresponding Japanese Patent Application No. 2010-230339 dated Jun. 24, 2014 with translation.

* cited by examiner

FIG. 3A

| SP-AP | COOPERATION |
|---|---|
| a | ○ |
| b | × |
| ⋮ | ⋮ |
| x | ○ |

FIG. 3B

| VEHICLE STATE | SP-AP | MATCH VEHICLE STATE |
|---|---|---|
| BEFORE START RUNNING | a | × |
| | d | ○ |
| | ⋮ | ⋮ |
| | x | ○ |
| RUNNING | a | ○ |
| | d | × |
| | ⋮ | ⋮ |
| ⋮ | ⋮ | ⋮ |

FIG. 3C

| SP-AP | USE LEVEL |
|---|---|
| a | 50 |
| b | 0 |
| ⋮ | ⋮ |
| x | 80 |

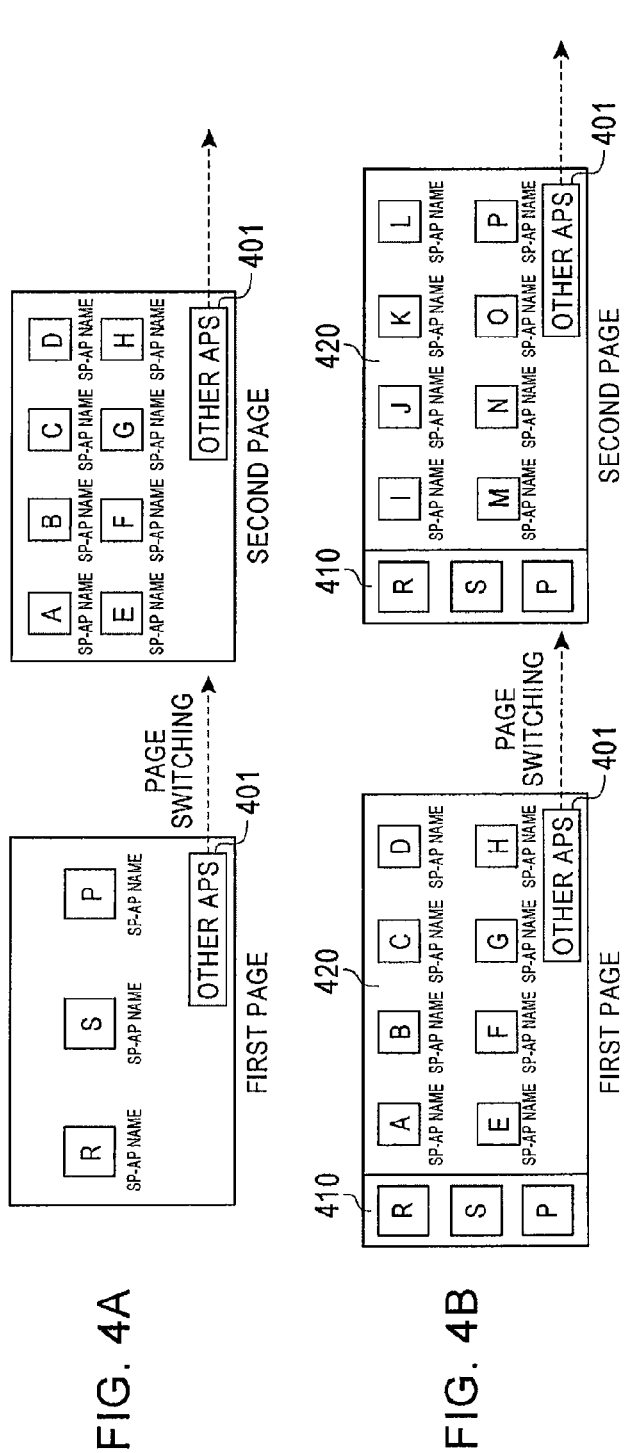
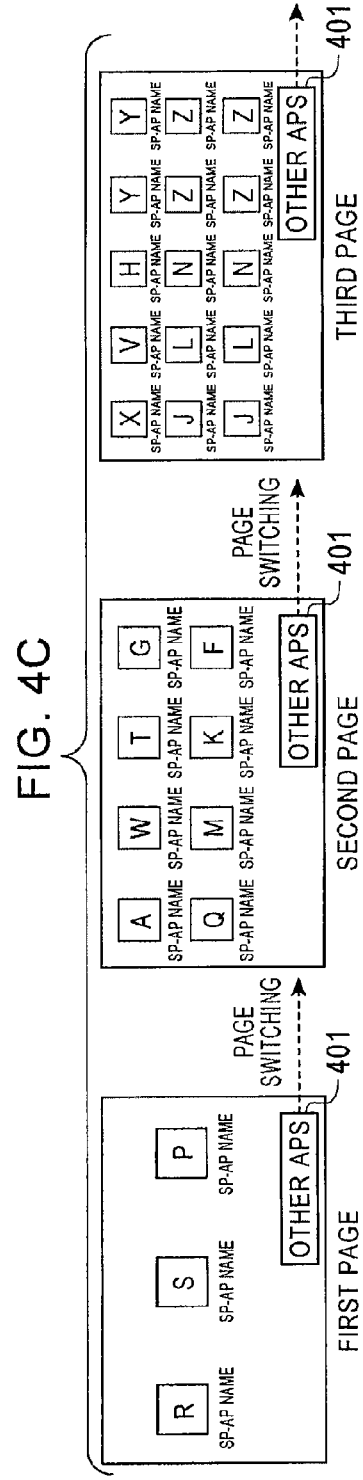
FIG. 4A
FIG. 4B
FIG. 4C

FIG. 6A

| SP-AP | COOPERATION |
|---|---|
| A | ○ |
| B | × |
| ⋮ | ⋮ |
| X | ○ |

FIG. 6B

| SP-AP | PROBABILITY OF IN-VEHICLE UTILIZATION |
|---|---|
| A | ○ |
| B | × |
| ⋮ | ⋮ |
| X | ○ |

FIG. 6C

| VEHICLE STATE | SP-AP | MATCH VEHICLE STATE |
|---|---|---|
| BEFORE START RUNNING | A | × |
| | B | × |
| | ⋮ | ⋮ |
| | X | ○ |
| RUNNING | A | ○ |
| | B | × |
| | ⋮ | ⋮ |
| ⋮ | ⋮ | ⋮ |

FIG. 6D

| SP-AP | USE LEVEL |
|---|---|
| A | 50 |
| B | 0 |
| ⋮ | ⋮ |
| X | 80 |

VEHICLE-MOUNTED DEVICE HAVING PORTABLE-DEVICE DETECTION CAPABILITY

PRIORITY CLAIM

This application claims the benefit of Japanese Patent Application No. 2010-230339, filed on Oct. 13, 2010, and which is incorporated by reference herein in its entirety.

BACKGROUND

1. Field of the Invention

The present invention relates to a technique for displaying a menu for in-vehicle utilization of applications of portable devices.

2. Description of the Related Art

As a technique relating to in-vehicle utilization of applications of portable devices, a technique for displaying, in a vehicle-mounted device connected to a portable device, a display screen permitting applications included in the portable device to be utilized from the vehicle-mounted device is known (see, for example, Japanese Unexamined Patent Application Publication (Translation of PCT Application) No. 2008-523745). Note that as used in this disclosure, the term "SP-AP" means "smartphone application" and the term "AP" means "application."

Additionally, as a technique for displaying a menu for selecting a to-be-launched application from a plurality of applications, a technique for displaying a list of identifications of applications arranged in order according to frequency in use of the applications and receiving selection of a to-be-launched application on the list is known (see, for example, Japanese Unexamined Patent Application Publication No. 2006-313486).

A utilization pattern indicating which application of the portable devices is utilized by users may differ depending on whether the applications of the portable devices are utilized in vehicles or not. This is because a need unique to in-vehicle utilization rises for the users in vehicles.

Accordingly, in the aforementioned list of identifications of applications simply arranged in order according to frequency in use of the applications, applications meeting a need of users in vehicle may not be arranged at the top. For this reason, the list does not necessarily make it easier for users in vehicles to select an application in accordance with their need.

SUMMARY

Accordingly, it is an object of the present invention to display a menu for utilization of applications of portable devices in accordance with a need of users in vehicles.

In accordance with an aspect of the present invention, a vehicle-mounted device, to which a portable device including a plurality of applications is selectively connected and which is mounted in a vehicle, includes: a portable-device connection detection unit configured to detect whether the portable device is connected to the vehicle-mounted device; a vehicle-state detection unit configured to detect a state of the vehicle; an application management table in which, for each state of the vehicle, previously selected applications that are highly likely to be utilized in the state are registered; an application-selection-menu display unit configured to generate and display an application selection menu in which icons of the respective applications included in the portable device connected to the vehicle-mounted device are arranged and to receive selection of an icon by a user on the application selection menu; and an application launch control unit configured to cause the portable device to launch an application corresponding to the icon, the selection of which the application-selection-menu display unit has received. When the portable-device connection detection unit detects that the portable device is connected to the vehicle-mounted device, the application-selection-menu display unit sets, as preferential applications, applications that are registered for a state detected by the vehicle-state detection unit in the application management table out of the applications included in the portable device connected to the vehicle-mounted device. The application-selection-menu display unit generates the application selection menu in which icons of the preferred applications are preferentially displayed to icons of other applications or the icons of the preferential applications are displayed in an emphasized manner.

Additionally, in accordance with another aspect of the present invention, a vehicle-mounted device, to which a portable device including a plurality of applications is selectively connected and which is mounted in a vehicle, includes: a portable-device connection detection unit configured to detect whether the portable device is connected to the vehicle-mounted device; an application-selection-menu display unit configured to generate and display an application selection menu in which icons of the respective applications included in the portable device connected to the vehicle-mounted device are arranged and to receive selection of an icon by a user on the application selection menu; and an application launch control unit configured to cause the portable device to launch an application corresponding to the icon, the selection of which the application-selection-menu display unit has received. When the portable-device connection detection unit detects that the portable device is connected to the vehicle-mounted device, the application-selection-menu display unit sets, as preferential applications, applications that operate in cooperation with the vehicle-mounted device out of the applications included in the portable device connected to the vehicle-mounted device. The application-selection-menu display unit displays the application selection menu in which icons of the preferential applications are preferentially displayed to icons of other applications or the icons of the preferential applications are displayed in an emphasized manner.

Here, these vehicle-mounted devices may be configured in a following manner. When the portable-device connection detection unit detects that the portable device is connected to the vehicle-mounted device, the application-selection-menu display unit generates the application selection menu including a plurality of pages to be sequentially displayed in response to a user operation. The application-selection-menu display unit arranges the icons of the preferential applications on a page to be displayed first and sequentially arranges the icons of the other applications on a page to be displayed second and following pages.

Alternatively, the vehicle-mounted devices may be configured in a following manner. When the portable-device connection detection unit detects that the portable device is connected to the vehicle-mounted device, the application-selection-menu display unit generates the application selection menu including a plurality of pages to be sequentially displayed in response to a user operation. The application-selection-menu display unit arranges the icons of the preferential applications at a given area on each page in common and sequentially arranges the icons of the other applications at an area other than the given area of each page.

Further, in accordance with still another aspect of the present invention, a vehicle-mounted device, to which a portable device including a plurality of applications is selectively connected and which is mounted in a vehicle, includes: a portable-device connection detection unit configured to detect whether the portable device is connected to the vehicle-mounted device; an application-selection-menu display unit configured to generate and display an application selection menu in which icons of the respective applications included in the portable device connected to the vehicle-mounted device are arranged and to receive selection of an icon by a user on the application selection menu; an application launch control unit configured to cause the portable device to launch an application corresponding to the icon, the selection of which the application-selection-menu display unit has received; and a use-level calculation unit configured to calculate, for each application, a use level indicating a degree that the application included in the portable device is used with the portable device being connected to the vehicle-mounted device. When the portable-device connection detection unit detects that the portable device is connected to the vehicle-mounted device, the application-selection-menu display unit displays the application selection menu in which the icons of the respective applications included in the portable device connected to the vehicle-mounted device are arranged in descending order of the use level of the applications calculated by the use-level calculation unit.

Here, such a vehicle-mounted device may be configured in a following manner. When the portable-device connection detection unit detects that the portable device is connected to the vehicle-mounted device, the application-selection-menu display unit generates the application selection menu including a plurality of pages to be sequentially displayed in response to a user operation. The application-selection-menu display unit sequentially arranges the icons of the respective applications on each page in descending order of the use level calculated by the use-level calculation unit so that an icon of an application having a higher use level is arranged on a page having a lower page number.

With the above-described vehicle-mounted devices, the application selection menu for selecting and launching an application of the portable device from the vehicle-mounted device is displayed so that icons of the applications that are highly likely to be utilized in the present state of the vehicle, of applications that operate in cooperation with the vehicle-mounted devices, and of applications that have been frequently used with the portable device being connected to the vehicle-mounted devices are displayed preferentially to the icons of the other applications or in an emphasized manner.

Accordingly, users can easily select and launch, in the vehicle-mounted devices, an application suitable for a need in the vehicle.

Additionally, in accordance with an aspect of the present invention, a portable device, which includes a plurality of applications and is selectively connected to a vehicle-mounted device mounted in a vehicle, includes: a connection detection unit configured to detect whether the portable device is connected to the vehicle-mounted device; an application attribute table in which previously selected applications that are highly likely to be utilized in the vehicle are registered; an application-menu display unit configured to generate and display an application menu in which icons of the respective applications included in the portable device are arranged and to receive selection of an icon by a user on the application menu; and an application launching unit configured to launch an application corresponding to the icon, the selection of which the application-menu display unit has received. When the connection detection unit detects that the vehicle-mounted device is connected to the portable device, the application-menu display unit sets, as preferential applications, applications that are registered in the application attribute table. The application-menu display unit generates the application menu in which icons of the preferential applications are preferentially displayed to icons of other applications or the icons of the preferential applications are displayed in an emphasized manner.

In addition, in accordance with still another aspect of the present invention, a portable device, which includes a plurality of applications and is selectively connected to a vehicle-mounted device mounted in a vehicle, includes: a connection detection unit configured to detect whether the portable device is connected to the vehicle-mounted device; an application-menu display unit configured to generate and display an application menu in which icons of the respective applications included in the portable device are arranged and to receive selection of an icon by a user on the application menu; and an application launching unit configured to launch an application corresponding to the icon, the selection of which the application-menu display unit has received. When the connection detection unit detects that the vehicle-mounted device is connected to the portable device, the application-menu display unit sets, as preferential applications, applications that operate in cooperation with the vehicle-mounted device out of the applications included in the portable device. The application-menu display unit displays the application menu in which icons of the preferential applications are preferentially displayed to icons of other applications or the icons of the preferential applications are displayed in an emphasized manner.

Additionally, in accordance with a further aspect of the present invention, a portable device, which includes a plurality of applications and is selectively connected to a vehicle-mounted device mounted in a vehicle, includes: a connection detection unit configured to detect whether the portable device is connected to the vehicle-mounted device; an application attribute table in which, for each state of the vehicle, previously selected applications that are highly likely to be utilized in the state are registered; an application-menu display unit configured to generate and display an application menu in which icons of the respective applications included in the portable device are arranged and to receive selection of an icon by a user on the application menu; and an application launching unit configured to launch an application corresponding to the icon, the selection of which the application-menu display unit has received. When the connection detection unit detects that the vehicle-mounted device is connected to the portable device, the application-menu display unit sets, as preferential applications, applications that are registered in the application attribute table for a present state of the vehicle in which the vehicle-mounted device connected to the portable device is mounted. The application-menu display unit generates the application menu in which icons of the preferential applications are preferentially displayed to icons of other applications or the icons of the preferential applications are displayed in an emphasized manner.

Here, such portable devices may be configured in a following manner. When the connection detection unit detects that the vehicle-mounted device is connected to the portable device, the application-menu display unit generates the application menu including a plurality of pages to be sequentially displayed in response to a user operation. The application-menu display unit arranges the icons of the preferential applications on a page to be displayed first and sequentially arranges the icons of the other applications on a page to be displayed second and following pages.

Alternatively, the portable devices may be configured in a following manner. When the connection detection unit detects that the vehicle-mounted device is connected to the portable device, the application-menu display unit generates the application menu including a plurality of pages to be sequentially displayed in response to a user operation. The application-menu display unit arranges the icons of the preferential applications at a given area on each page in common and sequentially arranges the icons of the other applications at an area other than the given area of each page.

Further, in accordance with a still further aspect of the present invention, a portable device, which includes a plurality of applications and is selectively connected to a vehicle-mounted device mounted in a vehicle, includes: a connection detection unit configured to detect whether the portable device is connected to the vehicle-mounted device; a use-level calculation unit configured to calculate, for each application, a use level indicating a degree that the application included in the portable device is used during a period when the connection detection unit detects that the vehicle-mounted device is connected to the portable device; an application-menu display unit configured to generate and display an application menu in which icons of the respective applications included in the portable device are arranged and to receive selection of an icon by a user on the application menu; and an application launching unit configured to launch an application corresponding to the icon, the selection of which the application-menu display unit has received. When the connection detection unit detects that the vehicle-mounted device is connected to the portable device, the application-menu display unit displays the application menu in which the icons of the respective applications included in the portable device are arranged in descending order of the use level of the applications calculated by the use-level calculation unit.

Here, such a portable device may be configured in a following manner. When the connection detection unit detects that the vehicle-mounted device is connected to the portable device, the application-menu display unit generates the application menu including a plurality of pages to be sequentially displayed in response to a user operation. The application-menu display unit sequentially arranges the icons of the respective applications on each page in descending order of the use level calculated by the use-level calculation unit so that an icon of an application having a higher use level is arranged on a page having a lower page number.

With the above-described portable devices, when the portable devices are connected to the vehicle-mounted device, the application menu for selecting and launching an application is displayed so that icons of the applications that are highly likely to be utilized in the vehicle, of the applications that operate in cooperation with the vehicle-mounted device, of the applications that are highly likely to be utilized in the present state of the vehicle, and of the applications that have been frequently used with the portable devices being connected to the vehicle-mounted device are displayed preferentially to the icons of the other applications or in an emphasized manner.

Accordingly, users can easily select and launch an application suitable for a need in the vehicle.

As described above, in accordance with the aspects of the present invention, a menu for utilization of applications of a portable device can be displayed in a form suitable for a need of users in vehicles.

BRIEF DESCRIPTION OF THE DRAWINGS

FIGS. 3A to 3C are diagrams illustrating an SP-AP management table in accordance with the first embodiment;

FIGS. 4A to 4C are diagrams illustrating an SP-AP selection menu in accordance with the first embodiment;

FIGS. 6A to 6D are diagrams illustrating an SP-AP attribute table in accordance with the second embodiment.

DETAILED DESCRIPTION

Embodiments of the present invention will be described below for an example case in which a smartphone serves as a portable device to be connected to a vehicle-mounted device.

A first embodiment will now be described.

Figure 1:
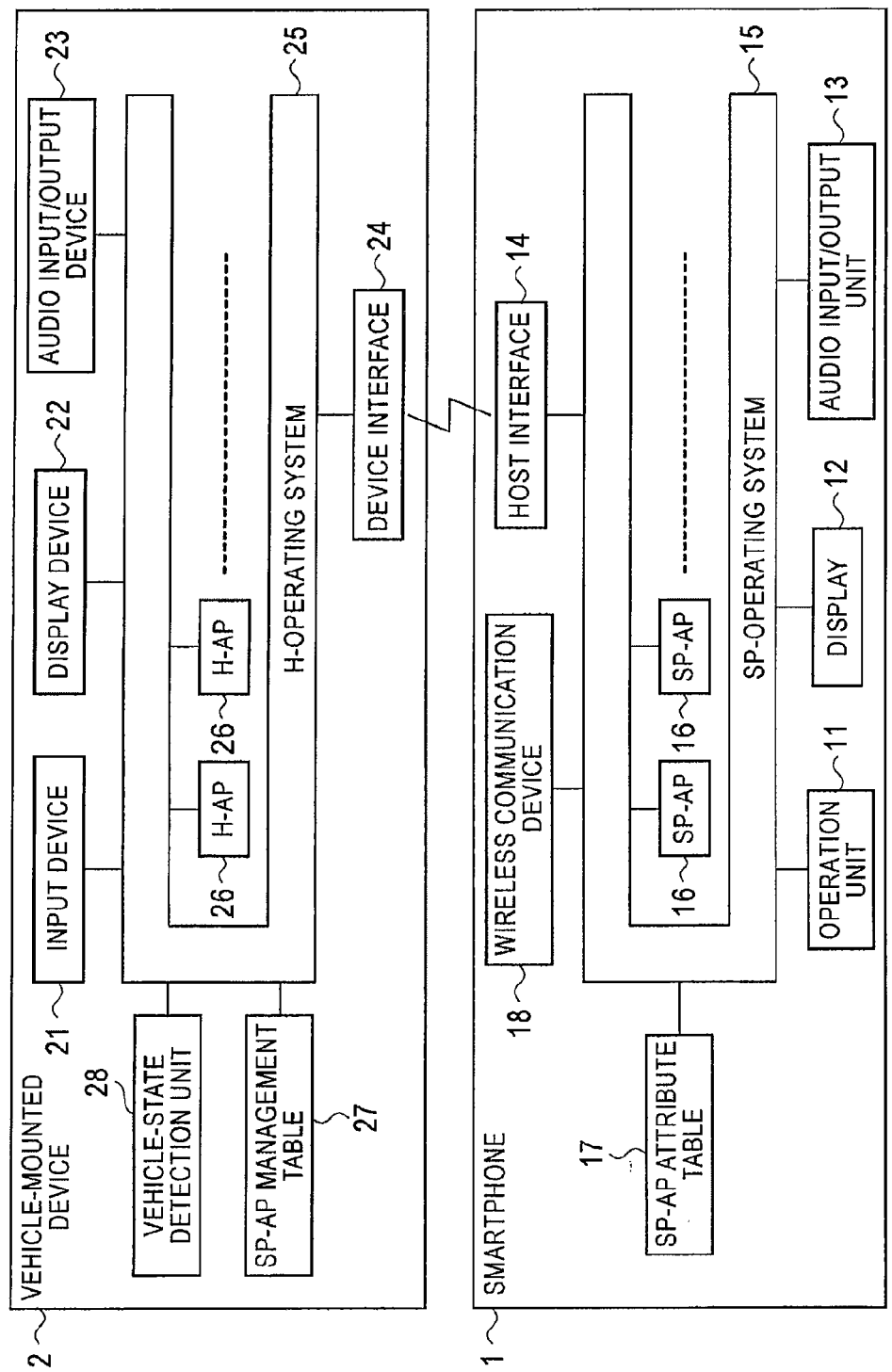
FIG. 1 is a block diagram illustrating a configuration of a smartphone and a configuration of a vehicle-mounted device in accordance with a first embodiment.

FIG. 1 illustrates configurations of a vehicle-mounted device and a smartphone in accordance with the first embodiment.

As illustrated in the figure, a smartphone 1 includes an operation unit 11, a display 12, an audio input/output unit 13 including a microphone and a speaker, a host interface 14 for connection to a vehicle-mounted device 2, an SP-operating system 15 that is an operating system (OS) of the smartphone 1, SP-APs 16 that are applications managed by and operating on the SP-operating system 15, an SP-AP attribute table 17, and a wireless communication device 18 for accessing a mobile phone network.

As the SP-APs 16, the smartphone 1 includes a plurality of applications, such as a mobile phone application for providing a mobile phone function.

The vehicle-mounted device 2 is mounted in a vehicle. As illustrated in the figure, the vehicle-mounted device 2 includes an input device 21, a display device 22, an audio input/output device 23 including a microphone and a speaker, a device interface 24, an H-operating system 25 that is an OS of the vehicle-mounted device 2, H-APs 26 that are applications managed by and operating on the H-operating system 25, an SP-AP management table 27, and a vehicle-state detection unit 28.

Here, the vehicle-state detection unit 28 of the vehicle-mounted device 2 is connected to an electronic control unit (ECU) of the vehicle, sensors detecting various states of the vehicle, and a car navigation system mounted in the vehicle. The vehicle-state detection unit 28 detects various vehicle states, such as on/off states of an engine of the vehicle, a stop state, a running state, occurrence of destination setting in the car navigation system, and a positional relationship between a destination and a current location. As the H-APs 26, the vehicle-mounted device 2 includes applications for performing various kinds of processing in cooperation with the SP-APs 16. For example, the vehicle-mounted device 2 includes an application for providing a user interface (UI) of the SP-AP 16 using the input device 21 and the display device 22, an application for transmitting information to be processed by the SP-AP 16 to the SP-AP 16, and an application for receiving and processing information from the SP-AP 16. In the description below, the SP-AP 16 that performs processing in cooperation with the vehicle-mounted device 2, such as the SP-AP 16 regarding which the H-AP 26 that performs processing in cooperation exists, is referred to as the SP-AP 16 that works in cooperation with the vehicle-mounted device 2.

The host interface 14 of the smartphone 1 and the device interface 24 of the vehicle-mounted device 2 are connected via Bluetooth (registered trademark), wireless fidelity (Wi-Fi), a universal serial bus (USB), and so forth to communicate with each other.

With such a configuration, the H-operating system 25 of the vehicle-mounted device 2 performs processing for displaying an SP-AP menu to provide users with a menu for selecting and launching the SP-AP 16 of the smartphone 1.

Figure 2:
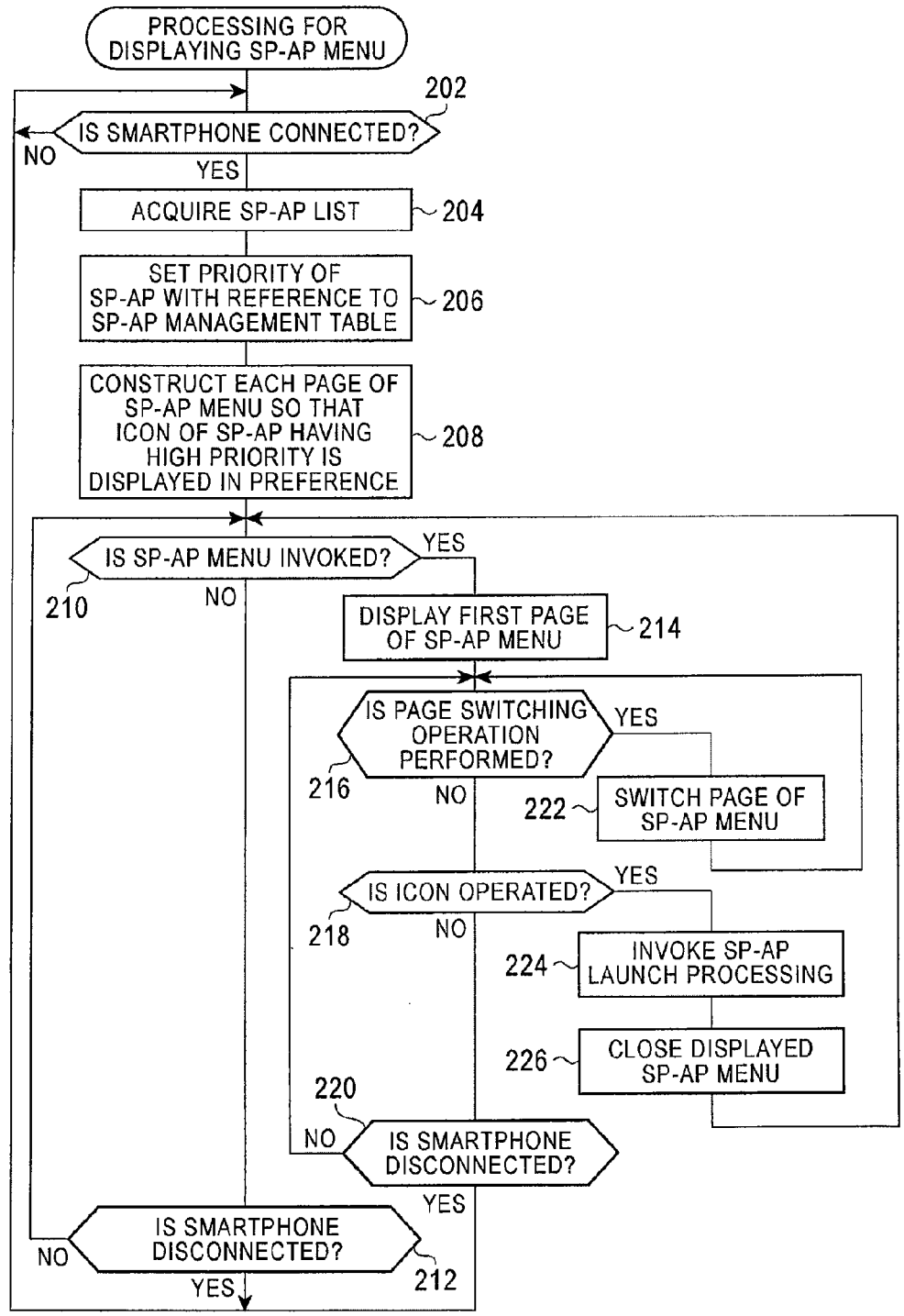
FIG. 2 is a flowchart illustrating processing for displaying a smartphone application (SP-AP) selection menu in accordance with the first embodiment.

FIG. 2 illustrates a procedure of this processing for displaying the SP-AP menu.

As illustrated in the figure, in this processing, the H-operating system 25 monitors connection of the smartphone 1 to the vehicle-mounted device 2 (step 202). Once the smartphone 1 is connected to the vehicle-mounted device 2, the H-operating system 25 acquires an SP-AP list from the smartphone 1 (step 204). The SP-AP list contains information on all SP-APs 16 included in the smartphone 1. As the information of each SP-AP 16, a name or an identifier of the SP-AP 16 and an icon image data serving as an icon representing the SP-AP 16 are included. This SP-AP list is sent to the H-operating system 25 of the vehicle-mounted device 2 from the SP-operating system 15 of the smartphone 1 in response to a request of the H-operating system 25 of the vehicle-mounted device 2.

After acquiring the SP-AP list in this manner, the H-operating system 25 then sets priority of each SP-AP 16 with reference to the SP-AP management table 27 (step 206). The H-operating system 25 also constructs each page of the SP-AP menu, which includes one or more pages with arranged icons, so that icons of the SP-APs 16 to which high priority is set are displayed preferentially to other icons (step 208).

Details of these steps 206 and 208 will be described later.

The H-operating system 25 then monitors occurrence of invoking of the SP-AP menu through a user operation using the input device 21 (step 210) and disconnection of the smartphone 1 from the vehicle-mounted device 2 (step 212). If the SP-AP menu is invoked (YES in step 210), the H-operating system 25 displays a first page of the SP-AP menu on the display device 22 (step 214).

After displaying the first page of the SP-AP menu on the display device 22 (step 214), the H-operating system 25 monitors occurrence of a user operation for switching the page of the SP-AP menu using the input device 21 (step 216), occurrence of a user operation for selecting an icon included in the currently displayed page of the SP-AP menu using the input device 21 (step 218), and disconnection of the smartphone 1 from the vehicle-mounted device 2 (step 220).

If the operation for switching the page of the SP-AP menu occurs (YES in step 216), the H-operating system 25 switches the page of the displayed SP-AP menu to a previous one or a next one in accordance with content of the page switching operation (step 222). The process then returns to steps 216 to 220 of monitoring. If the operation for selecting the icon occurs (YES in step 218), the H-operating system 25 sets the SP-AP 16 corresponding to the selected icon as a launch target and invokes SP-AP launch processing (step 224). The H-operating system 25 closes the displayed SP-AP menu (step 226) and the process returns to step 210. Here, the SP-AP launch processing is for requesting the SP-operating system 15 of the smartphone 1 to launch the launch-target SP-AP 16 and for launching the H-AP 26 if there is the H-AP 26 that works in cooperation with the launch-target SP-AP 16. The SP-operating system 15 of the smartphone 1 having received the launch request launches the requested SP-AP 16.

Meanwhile, when the H-AP 26 that works in cooperation with the SP-AP 16 displays a display screen constituting a UI of the SP-AP 16, the display screen of the display device 22 is switched, in response to launching of the SP-AP 16, from the SP-AP menu to the UI of the launched SP-AP 16 by the above processing. When the SP-AP 16 launched in step 224 does not work in cooperation with the vehicle-mounted device 2, the processing for displaying the SP-AP menu may be configured so that the H-operating system 25 gets back to monitoring in steps 216 to 220 without performing the processing for closing the displayed SP-AP menu in step 226.

If disconnection of the smartphone 1 from the vehicle-mounted device 2 occurs (YES in step 212 or step 220), the process returns to step 202.

The procedure of the processing for displaying the SP-AP menu has been described above.

As described above, the details of setting the priority of each SP-AP 16 performed in step 206 and constructing each page of the SP-AP menu performed in step 208 of the processing for displaying the SP-AP menu will be described below.

Examples of setting the priority of each SP-AP 16 and of constructing each page of the SP-AP menu will be illustrated below.

A first example of setting the priority of each SP-AP 16 and constructing each page of the SP-AP menu will now be described.

In the first example, identifier, such as name, of each SP-AP 16 that is included in the smartphone 1 or is possibly included in the smartphone 1 and information on whether the SP-AP 16 works in cooperation with the vehicle-mounted device 2 are previously registered in the SP-AP management table 27 as illustrated in FIG. 3A.

In step 206, high priority is given to the SP-APs 16 that are registered in the SP-AP management table 27 as ones working in cooperation with the vehicle-mounted device 2 out of the SP-APs 16 whose information is included in the SP-AP list acquired in step 204, whereas low priority is given to other SP-APs 16.

In step 208, as illustrated in FIG. 4A, icons of the high priority SP-APs 16 are arranged on the first page of the SP-AP menu and icons of the low priority SP-APs 16 are sequentially arranged on second and following pages. In this way, the SP-AP menu is constructed.

Alternatively, in step 208, the icons of the high priority SP-APs 16 are arranged at an area 410 provided at a left part of each page of the SP-AP menu in common, whereas the icons of the low priority SP-APs 16 are sequentially arranged at an area 420 provided at a right part of each page as illustrated in FIG. 4B. In this way, the SP-AP menu is constructed.

Meanwhile, referring to FIGS. 4A and 4B, icons "R", "S", "P" represent the high priority SP-APs 16, whereas other icons represent the low priority SP-APs 16.

A second example of setting the priority of each SP-AP 16 and constructing each page of the SP-AP menu will now be described.

More specifically, in the second example, an identifier, such as a name, of each SP-AP 16 that is included in the smartphone 1 or is possibly included in the smartphone 1 and vehicle-state matching information indicating whether the SP-AP 16 is likely to be utilized in the state are previously registered in the SP-AP management table 27 for each state of the vehicle as illustrated in FIG. 3B.

Here, the vehicle states, such as "before start running", "running", "stopped", "parked", "departing", "running around a destination", and "arriving at a destination" are used. For example, a state "before start running" is determined by setting a period after the smartphone 1 is connected and before the vehicle starts running as the state "before start running" A state "departing" is determined by setting a period after destination setting occurs in a car navigation system and before the vehicle starts running as the state "departing". Additionally, a state "stopped" is detected as a state in which the vehicle is not running but the engine is still on. A state "parked" is detected as a state in which the vehicle is not running and the engine is also off.

In addition, following applications correspond to the SP-APs 16 that are likely to be utilized in each state. In the state "before start running", a navigation application corresponds to the possibly utilized SP-AP 16. In a state "running", an application for guiding a vehicle to a gas station around a current location corresponds to the possibly utilized SP-AP 16. In the state "stopped" or "parked", a mail application corresponds to the possibly utilized SP-AP 16. In the state "departing", an application for providing weather forecast corresponds to the possibly utilized SP-AP 16. In a state "running around a destination", an application for guiding a vehicle to a parking lot around a current location corresponds to the possibly utilized SP-AP 16. In a state "arriving at a destination", an application for guiding a vehicle to nearby sights and an application for calculating or managing fuel efficiency correspond to the possibly utilized SP-APs.

In step 206, the H-operating system 25 determines the vehicle state based on the state detected by the vehicle-state detection unit 28. The H-operating system 25 then gives high priority to the SP-APs 16 registered in the SP-AP management table 27 as ones that are likely to be utilized in the determined vehicle state out of the SP-APs 16 whose information is included in the SP-AP list acquired in step 204 and gives low priority to other SP-APs 16.

In step 208, as in the first example, the H-operating system 25 constructs each page of the SP-AP menu in a manner illustrated in FIGS. 4A and 4B.

A third example of setting the priority of each SP-AP 16 and constructing each page of the SP-AP menu will now be described.

More specifically, in the third example, a use level of each SP-AP 16 in a state where the smartphone 1 is connected to the vehicle-mounted device 2 is managed in the SP-AP management table 27 as illustrated in FIG. 3C. As indicators of the use level, the number of times the SP-AP 16 is launched with the smartphone 1 being connected to the vehicle-mounted devices 3 within a given past period, utilization time of the SP-AP 16 (time after the SP-AP 16 is launched and until the SP-AP 16 is terminated) within a given past period, and so forth are used. Here, the H-operating system 25 of the vehicle-mounted device 2 calculates such a use level and registers the use level in the SP-AP management table 27. The calculation of the use level may be performed in a following manner. The SP-operating system 15 of the smartphone 1 notifies the H-operating system 25 of occurrence of launch/termination of each SP-AP 16 in the smartphone 1. Based on the notification, the H-operating system 25 calculates the use level of each SP-AP 16. Alternatively, the calculation of the use level of each SP-AP 16 may be performed based on occurrence of an operation, by the H-operating system 25 or the H-AP 26 of the vehicle-mounted device 2, for controlling the smartphone 1 to launch/terminate the SP-AP 16 of the smartphone 1.

In step 206, the H-operating system 25 sets priority of each SP-AP 16 so that the priority of the SP-AP 16 having a higher use level becomes high. In this embodiment, a first priority level is set for three SP-APs 16 having the highest use level. A second priority level lower than the first one is set for eight SP-APs 16 having the second highest use level. A third priority level lower than the second one is set for other SP-APs 16.

In step 208, as illustrated in FIG. 4C, the H-operating system 25 arranges icons of the SP-APs 16 having the first priority level on the first page of the SP-AP menu, arranges icons of the SP-APs 16 having the second priority level on the second page, and sequentially arranges icons of the SP-APs 16 having the third priority level on each of third and following pages to construct the SP-AP menu. Meanwhile, referring to FIG. 4C, icons "R", "S", and "P" represent the SP-APs 16 having the first priority level, whereas icons "A", "W", "T", "G", "Q", "M", "K", and "F" represent the SP-APs 16 having the second priority level. Other icons represent the SP-APs 16 having the third priority level.

A button 401 "OTHER APS" provided on each page of the SP-AP menu illustrated in FIGS. 4A, 4B, and 4C is for receiving a page switching operation from a user. Once the "OTHER APS" button 401 is operated, the displayed page is switched to a next one. Additionally, as illustrated in FIGS. 4A, 4B, and 4C, a name of each SP-AP 16 may be displayed under the corresponding icon on each page of the SP-AP menu.

The first embodiment of the present invention has been described above.

In the first embodiment described above, the SP-AP menu is constructed so that the icons of the SP-APs 16 to which high priority is set are displayed preferentially to other icons by operating positions at which the icons of the high priority SP-APs 16 are arranged. Instead of this configuration, the SP-AP menu may be constructed so that the icons of the high priority SP-APs 16 are displayed in a more emphasized manner than icons of the other SP-APs 16 by changing size and color of the icons of the high priority SP-APs 16 and by changing color, size, and font of the displayed names of the high priority SP-APs 16 from those of the other SP-APs 16.

A second embodiment of the present invention will be described below.

Configurations of a vehicle-mounted device 2 and a smartphone 1 in accordance with the second embodiment are similar to those illustrated in FIG. 1 in accordance with the first embodiment.

Figure 5:
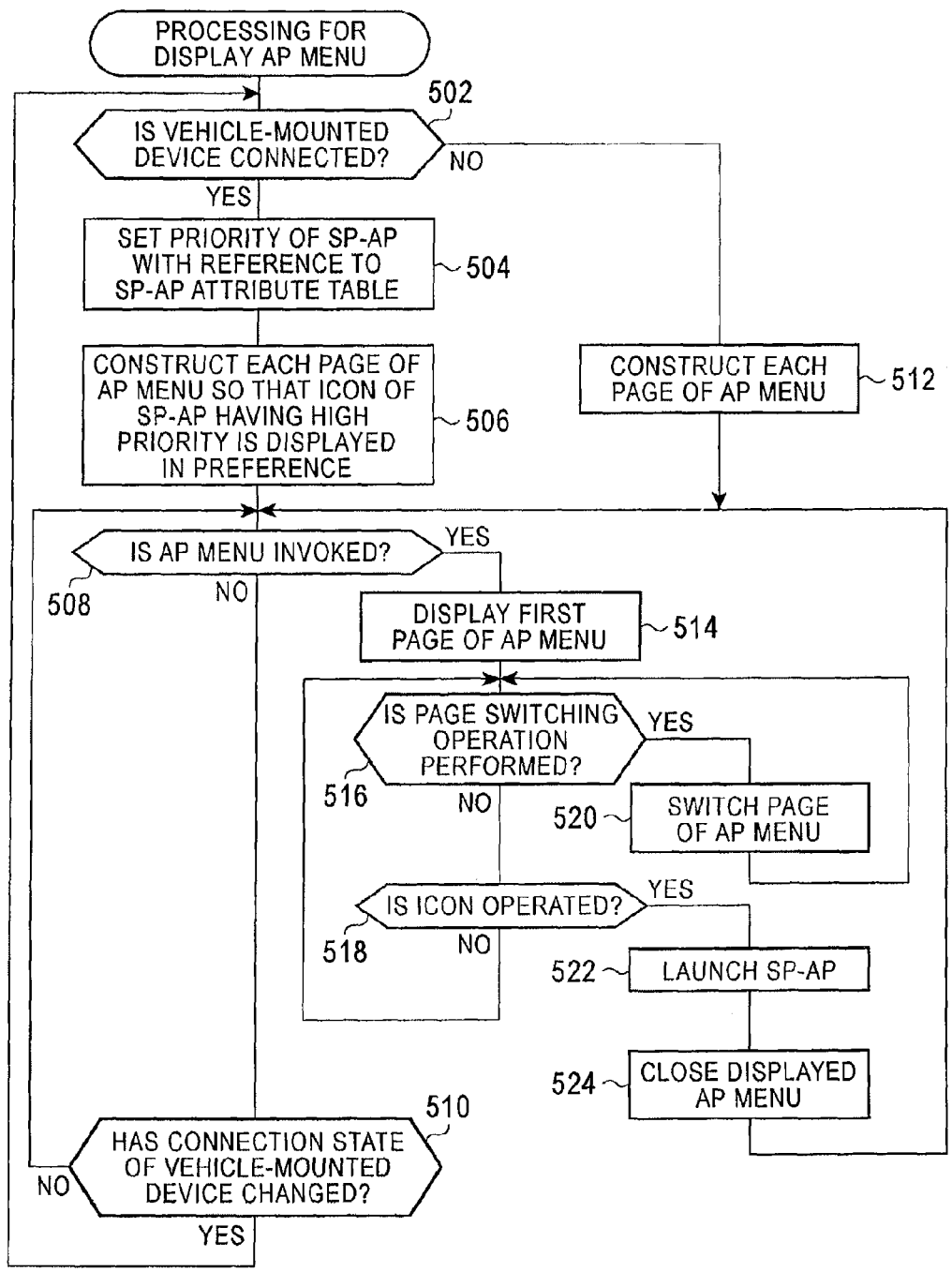
FIG. 5 is a flowchart illustrating processing for displaying an application (AP) selection menu in accordance with a second embodiment.

FIG. 5 illustrates a procedure of processing for displaying an AP menu performed by an SP-operating system 15 of the smartphone 1 to provide users with a menu for selecting and launching an SP-AP 16.

As illustrated in the figure, the SP-operating system 15 first determines in this processing whether the smartphone 1 is connected to the vehicle-mounted device 2 (step 502).

If the smartphone 1 is not connected to the vehicle-mounted device 2 (NO in step 502), the SP-operating system 15 constructs each page of an AP menu, which includes one or more pages with arranged icons, so that the icons are arranged on each page in given order (step 512). The process then proceeds to step 508.

In contrast, if the smartphone 1 is connected to the vehicle-mounted device 2 (YES in step 502), the SP-operating system 15 sets priority of each SP-AP 16 with reference to an SP-AP attribute table 17 (step 504). The SP-operating system 15 also constructs each page of the AP menu, which includes one or more pages with arranged icons, so that the icons of the SP-APs 16 having high priority are displayed preferentially to other icons (step 506). The process then proceeds to step 508.

Details of these steps 504 and 506 will be described in detail later.

After the process proceeds to step 508 in this way, the SP-operating system 15 monitors occurrence of invoking of the AP menu (step 508) and a change in the connection state (connected/disconnected) of the smartphone 1 to the vehicle-mounted device 2 (step 510). If the AP menu is invoked (YES in step 508), the SP-operating system 15 displays a first page of the AP menu on a display 12 (514). Here, the AP menu is invoked at the time of booting of the smartphone 1 and in response to a user operation for invoking the AP menu using an operation unit 11.

After displaying the first page of the AP menu on the display 12 (step 514), the SP-operating system 15 monitors occurrence of a user operation for switching the page of the AP menu using the operation unit 11 (step 516) and occurrence of a user operation for selecting an icon included in the displayed page of the AP menu using the operation unit 11 (step 518).

If the operation for switching the page of the AP menu occurs (YES in step 516), the SP-operating system 15 switches the displayed page of the AP menu to a previous one or a next one in accordance with content of the page switching operation (step 520). The process then returns to steps 516 and 518 of monitoring. On the other hand, if the operation for selecting the icon occurs (YES in step 518), the SP-operating system 15 launches the SP-AP 16 corresponding to the selected icon (step 522) and closes the displayed AP menu (step 524). The process then returns to step 508. Here, in response to launching of the SP-AP 16, a display screen of the display 12 is switched from the AP menu to a display screen constituting an UI of the launched SP-AP 16.

If the change in the connection state of the smartphone 1 to the vehicle-mounted device 2 occurs (YES in step 510), the process returns to step 502.

The procedure of the processing for displaying the AP menu has been described above.

Figure 7A:
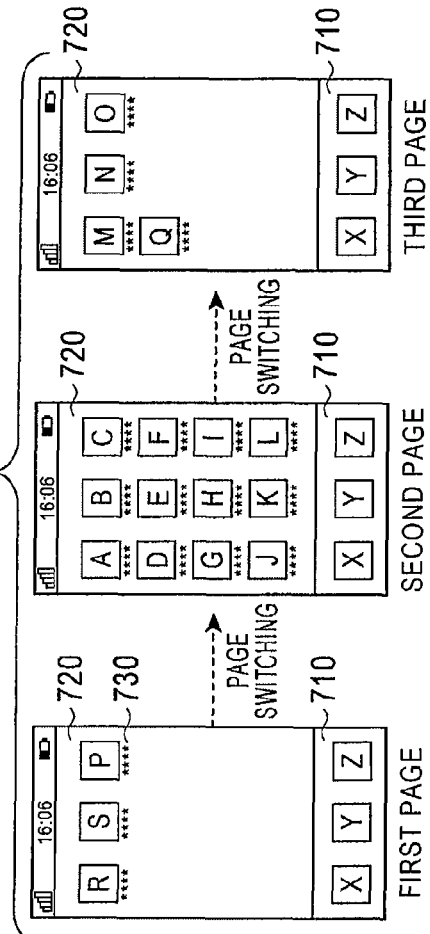
FIGS. 7A to 7D are diagram illustrating an AP selection menu in accordance with the second embodiment.

FIG. 7A illustrates a configuration of the AP menu constructed in step 512 when the smartphone 1 is not connected to the vehicle-mounted device 2.

As illustrated in the figure, the AP menu includes one or more pages. Each page includes a dock 710 that is a fixed area provided at a button part and a menu area 720 provided above the dock 710. At the dock 710 of each page, icons of the SP-APs 16 previously selected by users (i.e., icons "X", "Y", and "Z" in the figure) are arranged in common. In the menu area 720 of each page, icons of the other SP-APs 16 are sequentially arranged. In this way, the AP menu is constructed. Meanwhile, in step 516, a horizontal scroll operation using the operation unit 11 is received as the operation for switching the page of the AP menu.

As described above, the details of setting the priority of each SP-AP 16 and constructing each page of the AP menu performed in steps 504 and 506 of such processing for displaying the AP menu, respectively, will be described below in detail.

Examples of setting the priority of each SP-AP 16 and constructing each page of the AP menu will be illustrated below.

A first example of setting the priority of each SP-AP 16 and constructing each page of the AP menu will be described first.

In the first example, an identifier, such as a name, of each SP-AP 16 included in the smartphone 1 and information on whether the SP-AP 16 works in cooperation with the vehicle-mounted device 2 are previously registered in the SP-AP attribute table 17 as illustrated in FIG. 6A.

In step 504, the SP-operating system 15 gives high priority to the SP-APs 16 registered in the SP-AP attribute table 17 as ones that work in cooperation with the vehicle-mounted device 2 and gives low priority to other SP-APs 16.

Figure 7B:
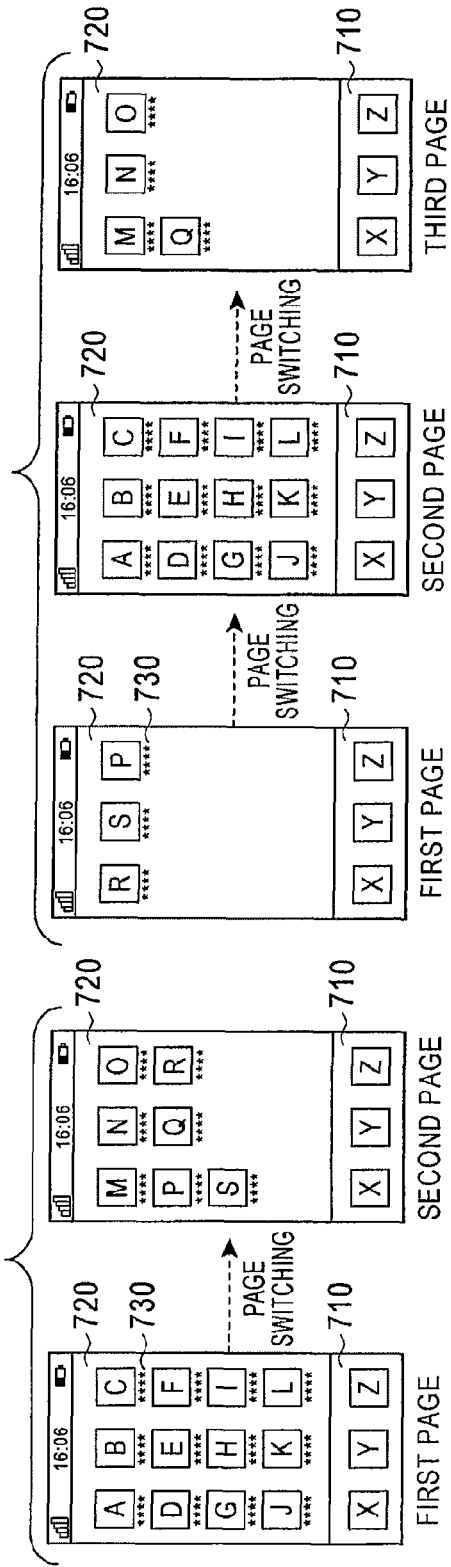

In step 506, as illustrated in FIG. 7B, the SP-operating system 15 arranges icons of the high priority SP-APs 16 at the menu area 720 of the first page of the AP menu and sequentially arranges icons other than those arranged at the dock 710, i.e., icons of the low priority SP-APs 16, at the menu area 720 of the second or following pages. In this way, the SP-operating system 15 constructs the AP menu. At the dock 710 of each page, icons of the SP-APs 16 previously selected by a user (i.e., icons of "X", "Y", and "Z" in the figure) are arranged in common.

Figure 7C:
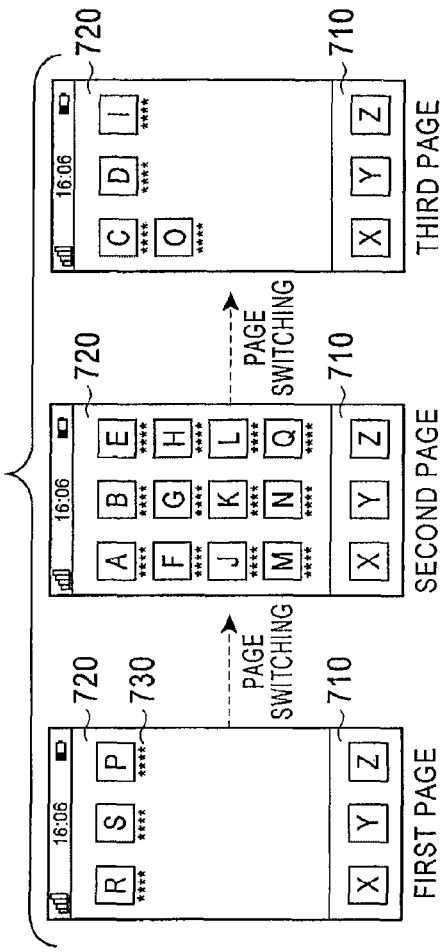

Alternatively, in step 506, the icons of the high priority SP-APs 16 are arranged in common in at the dock 710 of each page and the icons of the low priority SP-APs 16 are sequentially arranged at the menu area 720 of each page as illustrated in FIG. 7C. In this may, the AP menu is constructed.

Meanwhile, referring to FIGS. 7B and 7C, icons of "R", "S", and "P" represent the high priority SP-APs 16, whereas other icons represent the low priority SP-APs 16.

A second example of setting the priority of each SP-AP 16 and constructing of each page of the AP menu will be illustrated next.

More specifically, in the second example, an identifier, such as a name, of each SP-AP 16 included in the smartphone 1 and information on whether the SP-AP 16 is highly likely to be utilized in a vehicle are previously registered in the SP-AP attribute table 17 as illustrated in FIG. 6B. For example, a navigation application, an application for guiding a vehicle to a gas station, an application for guiding a vehicle to a parking lot, and an application for calculating and managing fuel efficiency of a vehicle corresponds to the SP-APs 16 that are highly likely to be utilized in the vehicle.

In step 504, the SP-operating system 15 gives high priority to the SP-APs 16 registered in the SP-AP attribute table 17 as ones that are highly likely to be utilized in the vehicle and gives low priority to other SP-APs 16.

In step 506, the SP-operating system 15 constructs each page of the AP menu as illustrated in FIGS. 7B and 7C as in the first example.

A third example of setting the priority of each SP-AP 16 and constructing each page of the AP menu will be illustrated next.

In the third example, as illustrated in FIG. 6C, an identifier, such as a name, of each SP-AP 16 that is included in the smartphone 1 or is possibly included in the smartphone 1 and vehicle-state matching information indicating whether the SP-AP 16 is likely to be utilized in the state are previously registered, for each state of the vehicle, in the SP-AP attribute table 17. Here, vehicle states similar to those used in the first embodiment, i.e., "before start running", "running", "stopped", "parked", "departing", "running around a destination", and "arriving at a destination", are used.

In step 504, the SP-operating system 15 determines a current vehicle state. The SP-operating system 15 gives high priority to the SP-APs 16 registered in the SP-AP attribute table 17 as ones that are likely to be utilized in the determined vehicle state and gives low priority to other SP-APs 16. Here, the SP-operating system 15 acquires a vehicle state detected by a vehicle-state detection unit 28 of the vehicle-mounted device 2 through the H-operating system 25 of the vehicle-mounted device 2 and determines the current vehicle state based on the acquired vehicle state. Alternatively, the SP-operating system 15 may determine the current vehicle state based on a current location calculation function, such as a global position system (GPS) function included in the smartphone 1, for calculating a current location or detecting whether the vehicle is moving, occurrence of destination setting in a navigation application included in the smartphone 1, and a positional relationship between a destination and a current location detected by the navigation application.

In step 506, as in the first example, the SP-operating system 15 constructs each page of the AP menu as illustrated in FIGS. 7B and 7C.

A fourth example of setting the priority of each SP-AP 16 and constructing each page of the AP menu will be illustrated next.

More specifically, in the fourth example, a use level of each SP-AP 16 in a state where the smartphone 1 is connected to the vehicle-mounted device 2 is managed in the SP-AP attribute table 17 as illustrated in FIG. 6D. As indicators of the use level, the number of times the SP-AP 16 is launched with the smartphone 1 being connected to the vehicle-mounted devices 3 within a given past period, utilization time of the SP-AP 16 (time after the SP-AP 16 is launched and until the SP-AP 16 is terminated) within a given past period, and so forth are used. Calculation of such a use level and registration of the use level in the SP-AP attribute table 17 are performed by the SP-operating system 15 of the smartphone 1 in accordance with an execution record of the SP-APs 16 on the SP-operating system 15.

In step 504, the SP-operating system 15 sets the priority of each SP-AP 16 so that higher priority is set for the SP-AP 16 having higher use level. In this embodiment, a first priority level is set for three SP-APs 16 having the highest use level, a second priority level lower than the first one is set for twelve SP-APs 16 having the second highest use level, and a third priority level lower than the second one is set for other SP-APs 16.

Figure 7D:
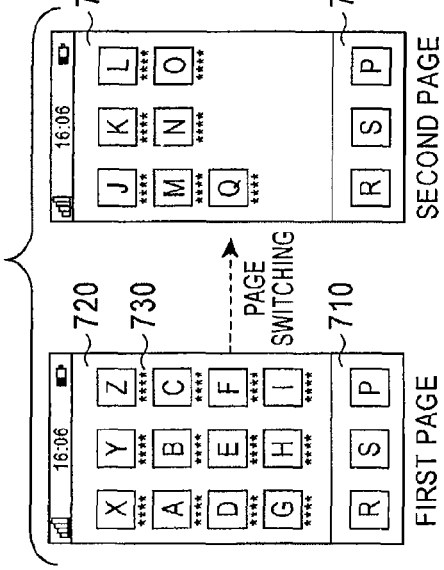

In step 506, as illustrated in FIG. 7D, the SP-operating system 15 arranges icons of the SP-APs 16 having the first priority level at the menu area 720 of the first page of the SP-AP menu, arranges icons of the SP-APs 16 having the second priority level at the menu area 720 of the second page, and sequentially arranges icons of the SP-APs 16 having the third priority level at the menu area 720 of on each of third and following pages. In this way, the SP-operating system 15 constructs the SP-AP menu. Meanwhile, icons of the SP-APs 16 previously selected by a user (i.e., icons "X", "Y", and "Z" in the figure) are arranged in common at the dock 710 of each page.

Referring to FIG. 7D, icons "R", "S", and "P" represent the SP-APs 16 having the first priority level, whereas icons "A", "B", "E", "F", "G", "H", "J", "K", "L", "M", "N", and "Q" represent the SP-APs 16 having the second priority level. Other icons represent the SP-APs 16 having the third priority level.

Additionally, as illustrated in FIGS. 7A, 7B, and 7C, a name 730 of each SP-AP 16 may be displayed under the corresponding icon on each page of the SP-AP menu.

The second embodiment of the present invention has been described above.

In the second embodiment described above, the SP-AP menu is constructed so that the icons of the SP-APs 16 to which high priority is set are displayed preferentially to other icons by operating positions at which the icons of the high priority SP-APs 16 are arranged. Instead of this configuration, the SP-AP menu may be constructed so that the icons of the high priority SP-APs 16 are displayed in a more emphasized manner than icons of the other SP-APs 16 by changing size and color of the icons of the high priority SP-APs 16 and by changing color, size, and font of the displayed names of the high priority SP-APs 16 from those of the other SP-APs 16.

Although preferred embodiments have been described in detail, the present invention is not limited to these specific embodiments. Rather, various modifications and changes can be made without departing from the scope of the present invention as described in the accompanying claims. Accordingly, all such modifications are intended to be included within the scope of this invention as defined in the following claims

What is claimed is:

1. A vehicle-mounted device to which a portable device having a plurality of applications therein, is selectively connected, the vehicle-mounted device configured to be mounted in a vehicle, the vehicle-mounted device comprising:
   a portable-device connection detection unit configured to detect whether the portable device is connected to the vehicle-mounted device;
   a vehicle-state detection unit configured to detect a state of the vehicle, including a vehicle running state, a vehicle stopped state, and a vehicle parked state;
   an application management table containing registration information therein corresponding to applications of the portable device that are to be utilized based on the detected state of the vehicle;
   an application-selection-menu display unit configured to generate and display a menu of icons corresponding to respective applications included in the portable device connected to the vehicle-mounted device, and configured to receive a selection of an icon by a user;
   an application launch control unit configured to cause the portable device to launch an application corresponding to the user-selected icon;
   a use-level calculation unit configured to calculate, for each application, a use level indicating a degree that the application included in the portable device is used with the portable device, and indicating a probability that each application is to be used in each of the vehicle running state, the vehicle stopped state, and the vehicle parked state;
   wherein, when the portable-device connection detection unit detects that the portable device is connected to the vehicle-mounted device, the application-selection-menu display unit sets, as preferred applications, applications having registration information corresponding to a current detected state of the vehicle; and
   wherein the icons corresponding to the preferential applications are automatically displayed in a preferential or emphasized manner in accordance with the calculated probability corresponding to the vehicle running state, the vehicle stopped state, and the vehicle parked state.

2. The vehicle-mounted device according to claim 1, wherein, when the portable-device connection detection unit detects that the portable device is connected to the vehicle-mounted device, in response to a user operation, the application-selection-menu display unit generates an application selection menu including a plurality of sequentially displayed pages; and
   wherein the application-selection-menu display unit arranges the icons of the preferred applications on a first page and arranges the icons of other applications on following pages.

3. The vehicle-mounted device according to claim 1, wherein, when the portable-device connection detection unit detects that the portable device is connected to the vehicle-mounted device, in response to a user operation, the application-selection-menu display unit generates the application selection menu including a plurality of pages to be sequentially displayed; and wherein the application-selection-menu display unit arranges the icons of the preferred applications at a given area on each page and arranges the icons of the other applications at an area other than the given area.

4. A vehicle-mounted device to which a portable device having a plurality of applications therein, is selectively connected, the vehicle-mounted device configured to be mounted in a vehicle, the vehicle-mounted device comprising:
    a portable-device connection detection unit configured to detect whether the portable device is connected to the vehicle-mounted device;
    an application-selection-menu display unit configured to generate a menu of icons corresponding to respective applications included in the portable device connected to the vehicle-mounted device, and configured to receive a selection of an icon by a user; and
    an application launch control unit configured to cause the portable device to launch an application corresponding to the user-selected icon;
    a use-level calculation unit configured to calculate, for each application, a use level indicating a degree that the application included in the portable device is used with the portable device; and indicating a probability that each application is to be used in each of a vehicle running state, a vehicle stopped state, and a vehicle parked state;
    wherein, when the portable-device connection detection unit detects that the portable device is connected to the vehicle-mounted device, the application-selection-menu display unit sets, as preferred applications having registration information corresponding to a current detected state of the vehicle, the current detected state including the vehicle running state, the vehicle stopped state, and the vehicle parked state; and
    wherein the icons corresponding to the preferred applications are automatically displayed in a preferential or emphasized manner in accordance with the calculated probability corresponding to the vehicle running state, the vehicle stopped state, and the vehicle parked state.

5. A vehicle-mounted device to which a portable device having a plurality of applications therein, is selectively connected, the vehicle-mounted device configured to be mounted in a vehicle, the vehicle-mounted device comprising:
    a portable-device connection detection unit configured to detect whether the portable device is connected to the vehicle-mounted device;
    an application-selection-menu display unit configured to generate and display a menu of icons corresponding to respective applications included in the portable device connected to the vehicle-mounted device, and configured to receive a selection of an icon by a user;
    an application launch control unit configured to cause the portable device to launch an application corresponding to the user-selected icon;
    a use-level calculation unit configured to calculate, for each application, a use level indicating a degree that the application included in the portable device is used with the portable device, the use level being used to determine a placement position of the icons of the application selection menu, and indicating a probability that each application is to be used in each of a vehicle running state, a vehicle stopped state, and a vehicle parked state;
    wherein, when the portable-device connection detection unit detects that the portable device is connected to the vehicle-mounted device, the application-selection-menu display unit displays the application selection menu in which the icons of the respective applications included in the portable device connected to the vehicle-mounted device are automatically arranged in descending order based on the use level of the applications calculated by the use-level calculation unit and in accordance with the calculated probability corresponding to the vehicle running state, the vehicle stopped state, and the vehicle parked state.

6. The vehicle-mounted device according to claim 5,
    wherein, when the portable-device connection detection unit detects that the portable device is connected to the vehicle-mounted device, the application-selection-menu display unit generates the application selection menu including a plurality of pages to be sequentially displayed in response to a user operation, and
    wherein the application-selection-menu display unit sequentially arranges the icons of the respective applications on each page in descending order of the use level calculated by the use-level calculation unit so that an icon of an application having a higher use level is arranged on a page having a lower page number.

7. A portable device including a plurality of applications, the portable device being selectively connected to a vehicle-mounted device mounted in a vehicle, the portable device comprising:
    a connection detection unit configured to detect whether the portable device is connected to the vehicle-mounted device;
    an application attribute table containing registration information therein corresponding to applications of the portable device that are to be utilized;
    an application-menu display unit configured to generate and display an application menu in which icons of the respective applications included in the portable device are arranged, and configured to receive selection of an icon by a user on the application menu;
    a use-level calculation unit configured to calculate, for each application, a use level indicating a degree that the application included in the portable device is used with the portable device, and indicating a probability that each application is to be used in each of a vehicle running state, a vehicle stopped state, and a vehicle parked state;
    an application launching unit configured to launch an application corresponding to the icon, the selection of which the application-menu display unit has received;
    wherein, when the connection detection unit detects that the vehicle-mounted device is connected to the portable device, the application-menu display unit sets, as preferred applications, applications that are registered in the application attribute table, and
    wherein the application-menu display unit generates the application menu in which icons of the preferred applications are automatically displayed in a preferential or emphasized manner in accordance with the calculated probability corresponding to the vehicle running state, the vehicle stopped state, and the vehicle parked state.

8. The portable device according to claim 7,
    wherein, when the connection detection unit detects that the vehicle-mounted device is connected to the portable device, the application-menu display unit generates the application menu including a plurality of pages to be sequentially displayed in response to a user operation, and
    wherein the application-menu display unit arranges the icons of the preferred applications on a page to be displayed first and sequentially arranges the icons of the other applications on a page to be displayed second and following pages.

9. The portable device according to claim 7,
wherein, when the connection detection unit detects that the vehicle-mounted device is connected to the portable device, the application-menu display unit generates the application menu including a plurality of pages to be sequentially displayed in response to a user operation, and
wherein the application-menu display unit arranges the icons of the preferred applications at a given area on each page in common and sequentially arranges the icons of the other applications at an area other than the given area of each page.

10. A portable device including a plurality of applications, the portable device being selectively connected to a vehicle-mounted device mounted in a vehicle, the portable device comprising:
a connection detection unit configured to detect whether the portable device is connected to the vehicle-mounted device;
an application-menu display unit configured to generate and display an application menu in which icons of the respective applications included in the portable device are arranged and to receive selection of an icon by a user on the application menu;
an application launching unit configured to launch an application corresponding to the icon, the selection of which the application-menu display unit has received;
a use-level calculation unit configured to calculate, for each application, a use level indicating a degree that the application included in the portable device is used with the portable device, and indicating a probability that each application is to be used in each of a vehicle running state, a vehicle stopped state, and a vehicle parked state;
wherein, when the connection detection unit detects that the vehicle-mounted device is connected to the portable device, the application-menu display unit sets, as preferred applications, applications that operate in cooperation with the vehicle-mounted device from applications included in the portable device, and
wherein the application-menu display unit displays the application menu in which icons of the preferred applications are automatically displayed in a preferential or emphasized manner in accordance with the calculated probability corresponding to the vehicle running state, the vehicle stopped state, and the vehicle parked state.

11. A portable device including a plurality of applications, the portable device being selectively connected to a vehicle-mounted device mounted in a vehicle, the portable device comprising:
a connection detection unit configured to detect whether the portable device is connected to the vehicle-mounted device;
an application attribute table in which, for each state of the vehicle, previously selected applications that are to be utilized in a current detected state of the vehicle, are registered;
an application-menu display unit configured to generate and display an application menu in which icons of the respective applications included in the portable device are arranged and to receive selection of an icon by a user on the application menu;
an application launching unit configured to launch an application corresponding to the icon, the selection of which the application-menu display unit has received;
a use-level calculation unit configured to calculate, for each application, a use level indicating a degree that the application included in the portable device is used with the portable device, and indicating a probability that each application is to be used in each of a vehicle running state, a vehicle stopped state, and a vehicle parked state;
wherein, when the connection detection unit detects that the vehicle-mounted device is connected to the portable device, the application-menu display unit sets, as preferred applications, applications that are registered in the application attribute table for a present state of the vehicle; and
wherein the application-menu display unit generates the application menu in which icons of the preferred applications are automatically and preferentially displayed relative to icons of other applications in accordance with the calculated probability corresponding to the vehicle running state, the vehicle stopped state, and the vehicle parked state.

12. A portable device including a plurality of applications, the portable device being selectively connected to a vehicle-mounted device mounted in a vehicle, the portable device comprising:
a connection detection unit configured to detect whether the portable device is connected to the vehicle-mounted device;
a use-level calculation unit configured to calculate, for each application, a use level indicating a degree that the application included in the portable device is used during a time period when the connection detection unit detects that the vehicle-mounted device is connected to the portable device, the use level being used to determine a placement position of the icons of the application selection menu, and indicating a probability that each application is to be used in each of a vehicle running state, a vehicle stopped state, and a vehicle parked state;
an application-menu display unit configured to generate and display an application menu in which icons of the respective applications included in the portable device are arranged, and configured to receive selection of an icon by a user on the application menu; and
an application launching unit configured to launch an application corresponding to the icon, the selection of which the application-menu display unit has received,
wherein, when the connection detection unit detects that the vehicle-mounted device is connected to the portable device, the application-menu display unit displays the application menu in which the icons of the respective applications included in the portable device are automatically arranged in descending order based on the use level of the applications calculated by the use-level calculation unit and in accordance with the calculated probability corresponding to the vehicle running state, the vehicle stopped state, and the vehicle parked state.

13. The portable device according to claim 12,
wherein, when the connection detection unit detects that the vehicle-mounted device is connected to the portable device, the application-menu display unit generates the application menu including a plurality of pages to be sequentially displayed in response to a user operation, and
wherein the application-menu display unit sequentially arranges the icons of the respective applications on each page in descending order of the use level calculated by the use-level calculation unit so that an icon of an application having a higher use level is arranged on a page having a lower page number.

14. A computer program product comprising instructions on a non-transitory computer readable medium, the instructions executed by a computer that is mounted in a vehicle and to which a portable device having a plurality of applications is connected, the computer program causing the computer to function as:
- a portable-device connection detection unit configured to detect whether the portable device is connected to the computer;
- a vehicle-state detection unit configured to detect a state of the vehicle, including a vehicle running state, a vehicle stopped state, and a vehicle parked state;
- an application management table in which, for each state of the vehicle, previously selected applications that are to be utilized in the state are registered;
- an application-selection-menu display unit configured to generate and display an application selection menu in which icons of the respective applications included in the portable device connected to the computer are arranged, and configured to receive selection of an icon by a user on the application selection menu;
- an application launch control unit configured to cause the portable device to launch an application corresponding to the icon, the selection of which the application-selection-menu display unit has received;
- a use-level calculation unit configured to calculate, for each application, a use level indicating a degree that the application included in the portable device is used with the portable device, and indicating a probability that each application is to be used in each of the vehicle running state, the vehicle stopped state, and the vehicle parked state;
- wherein, when the portable-device connection detection unit detects that the portable device is connected to the vehicle-mounted device, the application-selection-menu display unit sets, as a preferred applications, applications that are registered for a state detected by the vehicle-state detection unit in the application management table from the applications included in the portable device; and
- wherein the application-selection-menu display unit generates the application selection menu in which icons of the preferred applications are automatically and preferentially displayed relative to icons of other applications in accordance with the calculated probability corresponding to the vehicle running state, the vehicle stopped state, and the vehicle parked state.

15. The computer program product according to claim 14, wherein, when the portable-device connection detection unit detects that the portable device is connected to the vehicle-mounted device, the application-selection-menu display unit generates the application selection menu including a plurality of pages to be sequentially displayed in response to a user operation, and
wherein the application-selection-menu display unit arranges the icons of the preferred applications on a page to be displayed first and sequentially arranges the icons of the other applications on a page to be displayed second and following pages.

16. The computer program product according to claim 14, wherein, when the portable-device connection detection unit detects that the portable device is connected to the vehicle-mounted device, the application-selection-menu display unit generates the application selection menu including a plurality of pages to be sequentially displayed in response to a user operation, and
wherein the application-selection-menu display unit arranges the icons of the preferred applications at a given area on each page in common and sequentially arranges the icons of the other applications at an area other than the given area of each page.

17. A computer program product comprising instructions on non-transitory computer readable medium, the instructions executed by a computer that is mounted in a vehicle and to which a portable device including a plurality of applications is selectively connected, the computer program causing the computer to function as:
- a portable-device connection detection unit configured to detect whether the portable device is connected to the computer;
- an application-selection-menu display unit configured to generate and display an application selection menu in which icons of the respective applications included in the portable device and configured to receive selection of an icon by a user on the application selection menu;
- an application launch control unit configured to cause the portable device to launch an application corresponding to the icon, the selection of which the application-selection-menu display unit has received;
- a use-level calculation unit configured to calculate, for each application, a use level indicating a degree that the application included in the portable device is used with the portable device, and indicating a probability that each application is to be used in each of a vehicle running state, a vehicle stopped state, and a vehicle parked state;
- wherein, when the portable-device connection detection unit detects that the portable device is connected to the vehicle-mounted device, the application-selection-menu display unit sets, as preferred applications, applications that operate in cooperation with the computer from the applications included in the portable device; and
- wherein the application-selection-menu display unit displays the application selection menu in which icons of the preferred applications are automatically and preferentially displayed relative to icons of other applications or the icons of the preferred applications are automatically displayed in an emphasized manner in accordance with the calculated probability corresponding to the vehicle running state, the vehicle stopped state, and the vehicle parked state.

18. A computer program product comprising instructions on non-transitory computer readable medium, the instructions executed by a computer that is mounted in a vehicle and to which a portable device including a plurality of applications is selectively connected, the computer program product causing the computer to function as:
- a portable-device connection detection unit configured to detect whether the portable device is connected to the computer;
- an application-selection-menu display unit configured to generate and display an application selection menu in which icons of the respective applications included in the portable device connected to the computer are arranged and to receive selection of an icon by a user on the application selection menu;
- an application launch control unit configured to cause the portable device to launch an application corresponding to the icon, the selection of which the application-selection-menu display unit has received; and a use-level calculation unit configured to calculate, for each application, a use level indicating a degree that the application included in the portable device is used with the portable device being connected to the computer, the use level being used to determine a placement position of the icons of the application selection menu, and indicating a probability that each application is to be used in each of a vehicle running state, a vehicle stopped state, and a vehicle parked state;

wherein, when the portable-device connection detection unit detects that the portable device is connected to the vehicle-mounted device, the application-selection-menu display unit displays the application selection menu in which the icons of the respective applications included in the portable device connected to the computer are automatically arranged in descending order based on the use level of the applications calculated by the use-level calculation unit and in accordance with the calculated probability corresponding to the vehicle running state, the vehicle stopped state, and the vehicle parked state.

19. The computer program product according to claim 18, wherein, when the portable-device connection detection unit detects that the portable device is connected to the vehicle-mounted device, the application-selection-menu display unit generates the application selection menu including a plurality of pages to be sequentially displayed in response to a user operation, and wherein the application-selection-menu display unit sequentially arranges the icons of the respective applications on each page in descending order of the use level calculated by the use-level calculation unit so that an icon of an application having a higher use level is arranged on a page having a lower page number.

\* \* \* \* \*